MOORE & AYLWERD.
Carriage Pole and Shaft.
No. 93,466.
Patented Aug. 10, 1869.
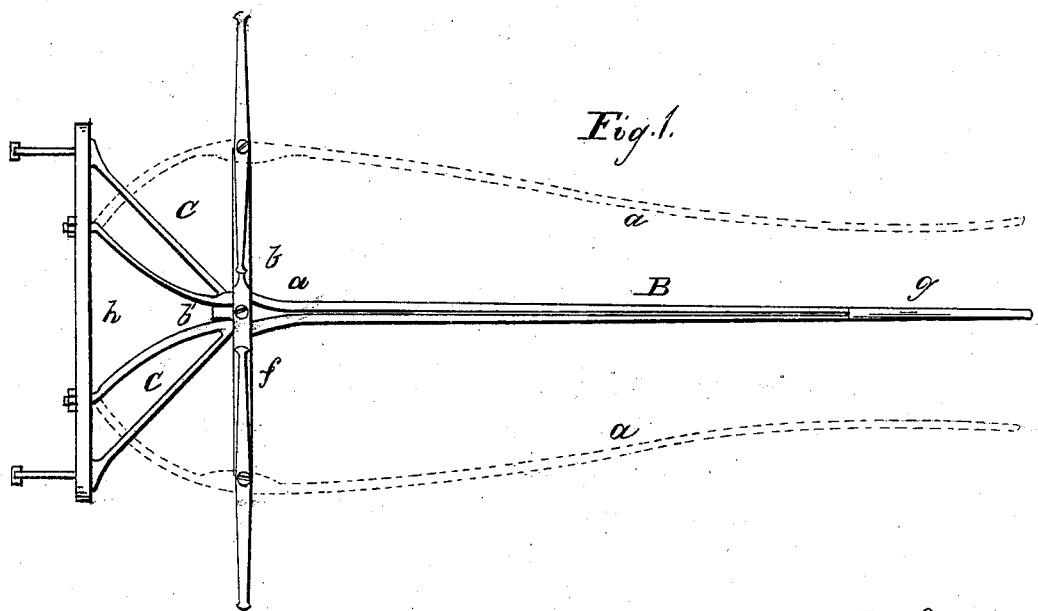
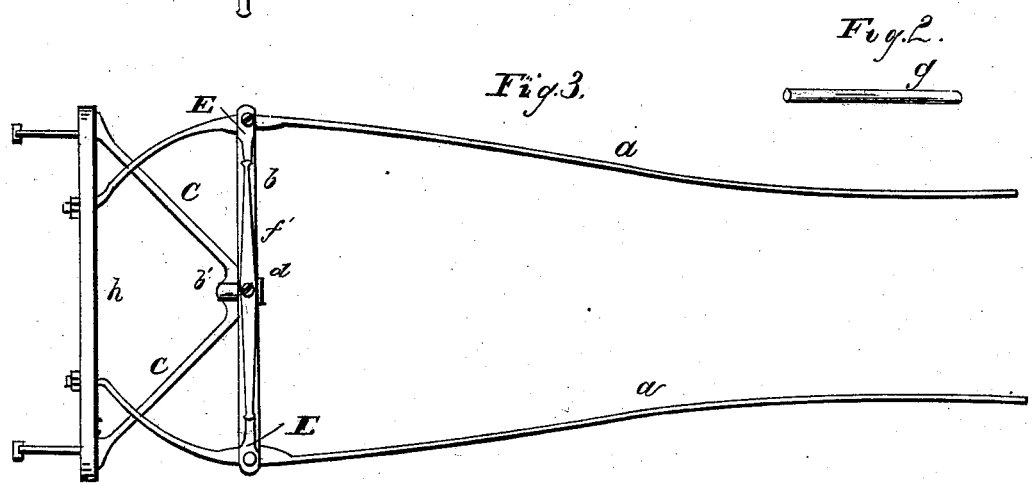
Witnesses:
Inventors:

United States Patent Office.

AUGUSTUS MOORE AND JOHN AYLWERD, OF MISSION SAN JOSÉ, CALIFORNIA.

Letters Patent No. 93,466, dated August 10, 1869.

IMPROVEMENT IN CARRIAGE-POLES AND SHAFTS COMBINED.

The Schedule referred to in these Letters Patent and making part of the same.

*To all whom it may concern:*

Be it known that we, AUGUSTUS MOORE and JOHN AYLWERD, of the Mission San José, county of Alameda, and State of California, have invented certain new and useful Improvements in Carriage-Poles and Shafts or Thills Combined; and we do hereby declare that the following description and accompanying drawings are sufficient to enable any person skilled in the art or science to which it most nearly appertains, to make and use our said invention or improvements, without further invention or experiment.

Referring to the drawings, and letters marked thereon, for a better explanation of our invention—

Figure 1 is a plan of the pole, with the thills in position, shown by dotted lines.

Figure 2 is a plan of cap for the end of pole, when the thills are placed in position to form it.

Figure 3 represents a plan of the thills after adjustment from the pole.

The nature of our invention consists in dividing the pole longitudinally from end to end, so that by removing the cap at the end of the pole, and turning the two divisions bottom up, and spreading them apart, and adjusting the whiffletrees, perfect thills are formed for one horse, without the delay in uncoupling from the vehicle, to change from pole to shafts.

*a a* represent the two divisions of the pole B, which are kept apart by a lug or top piece, *b'*, to which the lateral brace-rods *c c* are attached, the two divisions resting on the plate, and are flush with the top of the centre-piece.

The top or centre-piece is pierced for a bolt, *d*, which holds the evener *f*, to which the two whiffletrees are connected.

Holes are also made in the two divisions of the pole, on a line with the evener, for two screw-bolts, *e e*, which pass through the holes in the shafts, and the evener now acts as a brace or cross-bar for the thills, as well as a place of attachment for the whiffletree *f'*.

A cap, *g*, is placed over the end of the pole to keep it from spreading, and to prevent accident by too sharp a point.

To change the pole into thills or shafts, it is only necessary to place the evener longitudinally with the pole and turn the two shafts over bottom up, right and left, and adjust the bolts in the two holes in the shafts, when one whiffletree is to be removed, and the other one placed in the centre of the evener, and shafts are formed for one horse, with as regular curves as if they had been constructed and attached permanently at first. (Shown by dotted lines, fig. 1.)

The coupling connection of the thills through the cross-bar *h* is such that it admits of their being easily turned.

By this means a carriage pole for two horses or thills for one horse can be quickly and easily formed, and without the necessary expense of obtaining and keeping the two at hand.

As a general thing, good tough wood will answer for the construction of our device, while the cap at the end of the pole may be made of metal.

Having thus described our invention,

What we claim, and desire to secure by Letters Patent, is—

The device described, consisting of the thills *a a*, uniting to form the pole B, evener *f*, braces *c c*, and cap *g*, the whole being constructed, arranged, and operated in the manner described for the purpose set forth.

In witness whereof, we have hereunto set our hands and seals.

AUGUSTUS MOORE. [L. S.]
JOHN AYLWERD. [L. S.]

Witnesses:
C. WM. SMITH,
JAS. M. YONGE.